(12) United States Patent
Chuang

(10) Patent No.: US 10,317,207 B2
(45) Date of Patent: Jun. 11, 2019

(54) THREE-DIMENSIONAL TRACE VERIFICATION APPARATUS AND METHOD THEREOF

(71) Applicant: MOXA INC., New Taipei (TW)

(72) Inventor: Po-Yu Chuang, New Taipei (TW)

(73) Assignee: MOXA INC., New Taipei (TW)

( * ) Notice: Subject to any disclaimer, the term of this patent is extended or adjusted under 35 U.S.C. 154(b) by 343 days.

(21) Appl. No.: 15/455,104

(22) Filed: Mar. 9, 2017

(65) Prior Publication Data

US 2018/0259920 A1 Sep. 13, 2018

(51) Int. Cl.
*G01C 7/00* (2006.01)
*G01C 21/14* (2006.01)

(52) U.S. Cl.
CPC .............. *G01C 7/00* (2013.01); *G01C 21/14* (2013.01)

(58) Field of Classification Search
CPC ........................................................ G01C 7/00
USPC ........................................................ 702/189
See application file for complete search history.

(56) References Cited

U.S. PATENT DOCUMENTS

| 9,798,324 | B2 * | 10/2017 | Nevdahs | G05D 1/0094 |
| 10,210,905 | B2 * | 2/2019 | Castleman | B64C 39/024 |
| 10,234,873 | B2 * | 3/2019 | Li | B64D 47/08 |
| 10,241,520 | B2 * | 3/2019 | Sun | G05D 1/0816 |
| 2017/0359554 | A1 * | 12/2017 | Madhav | B64C 39/024 |

* cited by examiner

*Primary Examiner* — Hien D Khuu
(74) *Attorney, Agent, or Firm* — Chih Feng Yeh; Huntington IP Consulting Co., Ltd.

(57) ABSTRACT

The present disclosure illustrates a three-dimensional trace verification apparatus and method thereof. The three-dimensional trace verification apparatus includes a signal emitting module and a platform module configured to maintain a fixed relative location. When a motion trace of the platform module is different from a pre-recorded trace of a trace transmitting module, the trace transmitting outputs a deviation signal according to a sensed signal. This mechanism can achieve a technical effect of automatically verifying whether the motion trace of the platform module and the pre-record trace made by a user are the same, and recording the error.

14 Claims, 8 Drawing Sheets

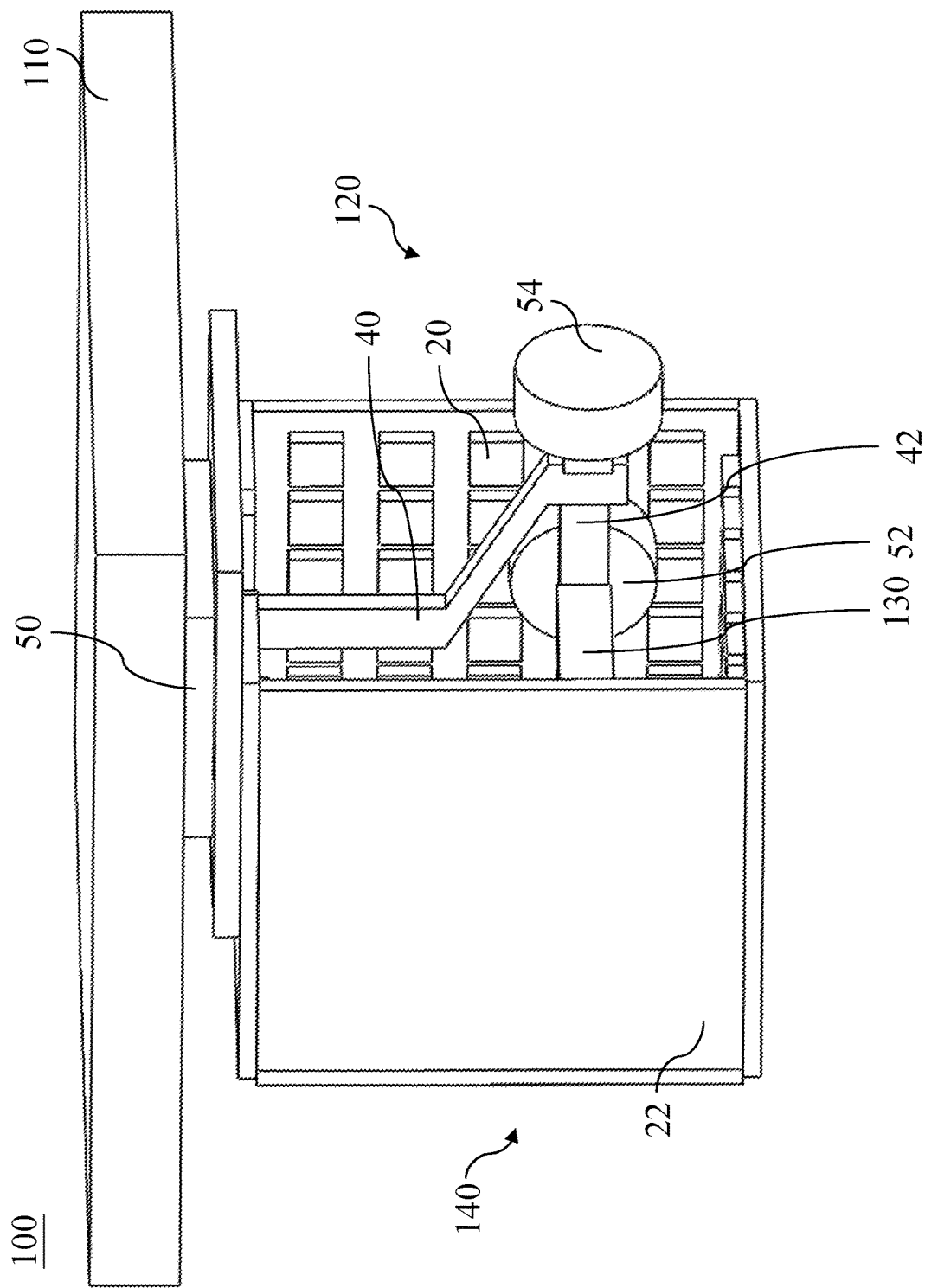

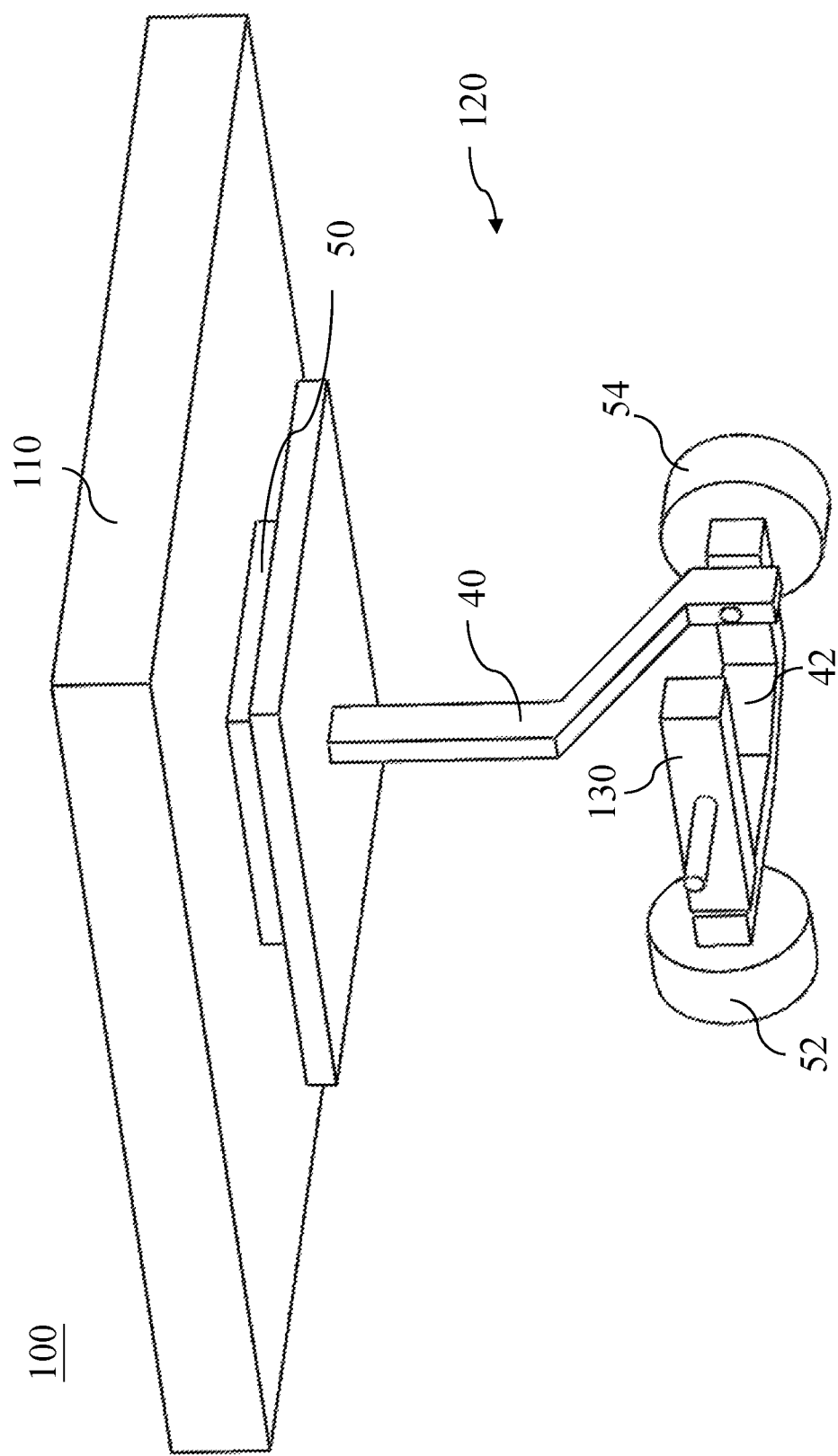
[FIG. 2]

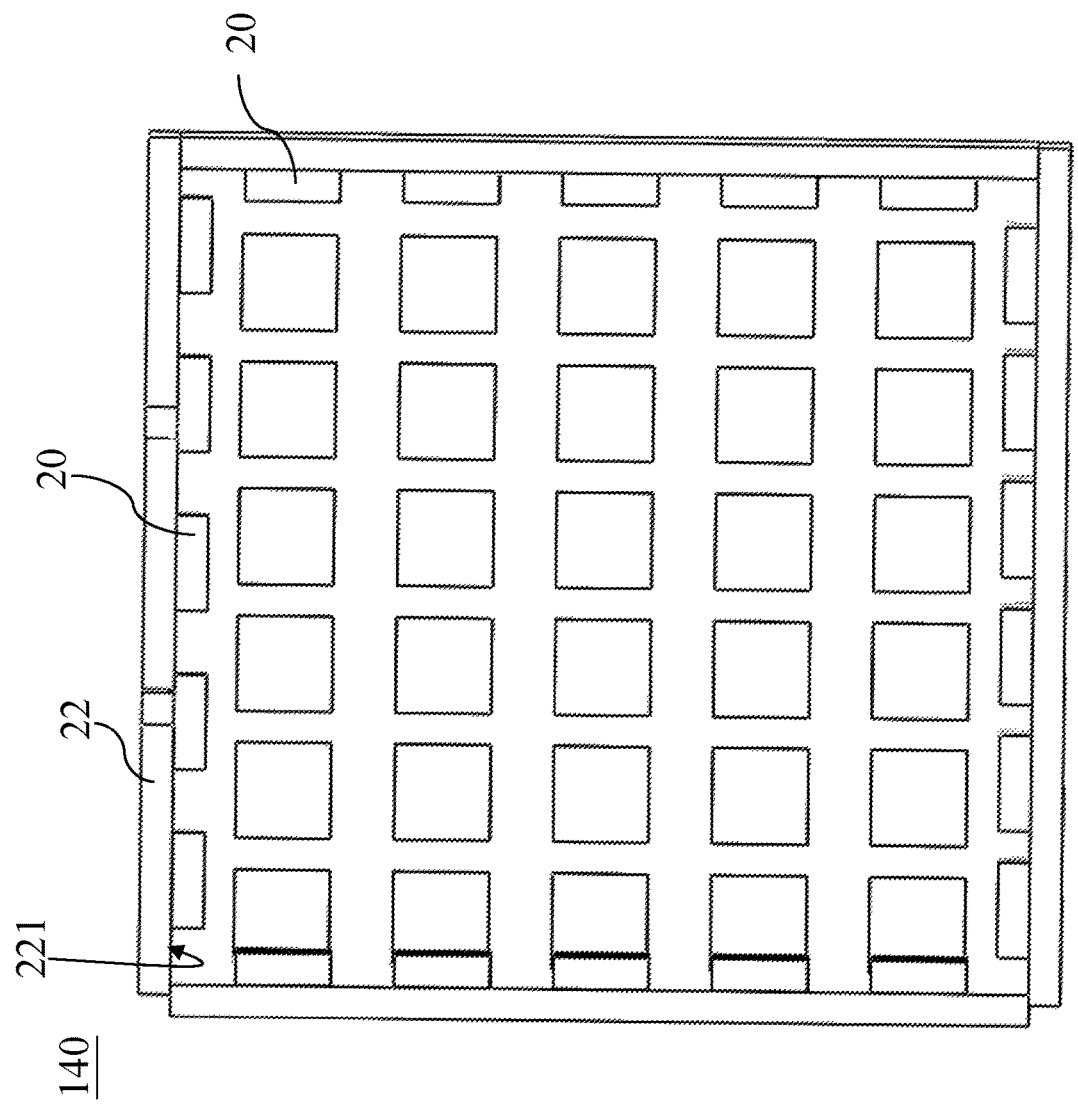

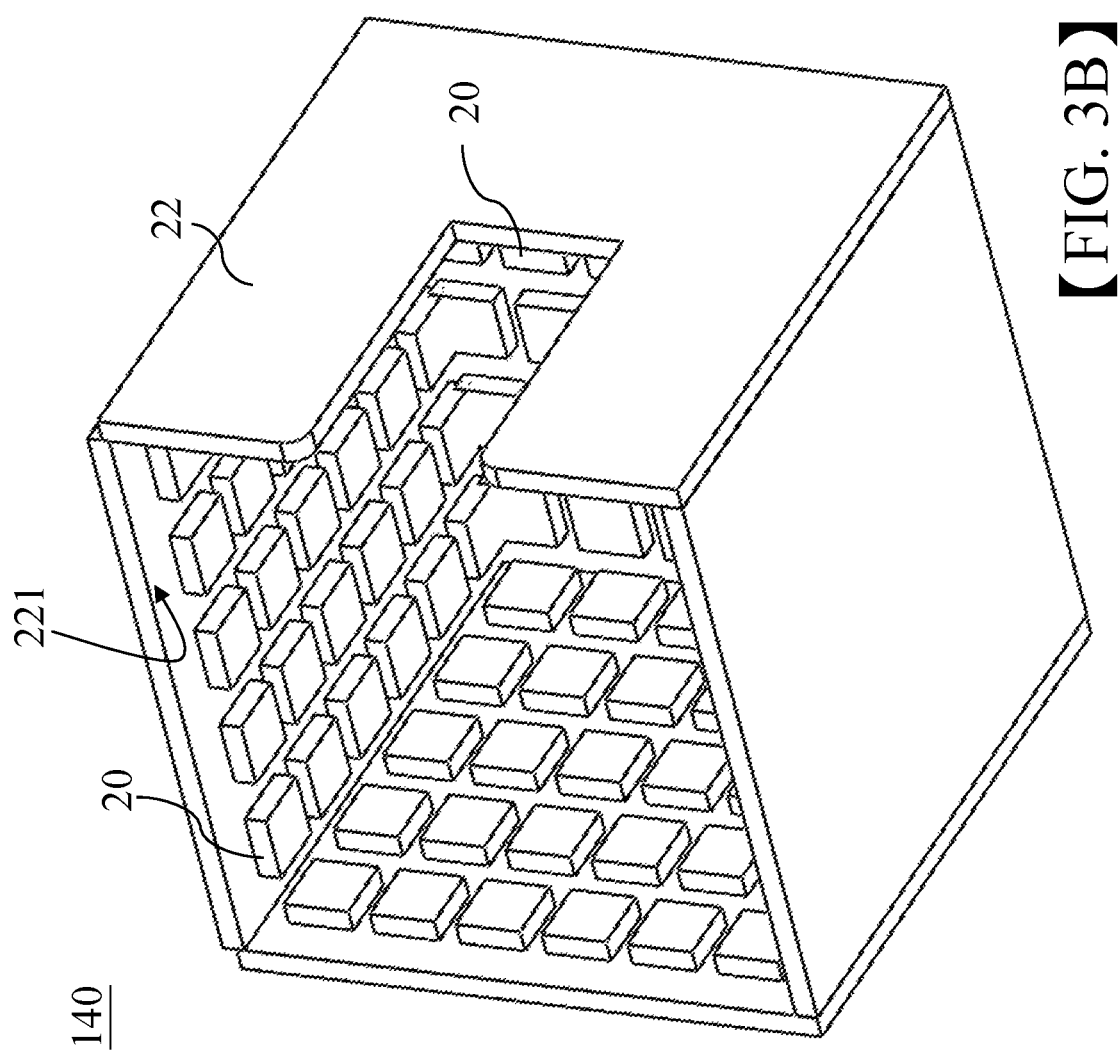

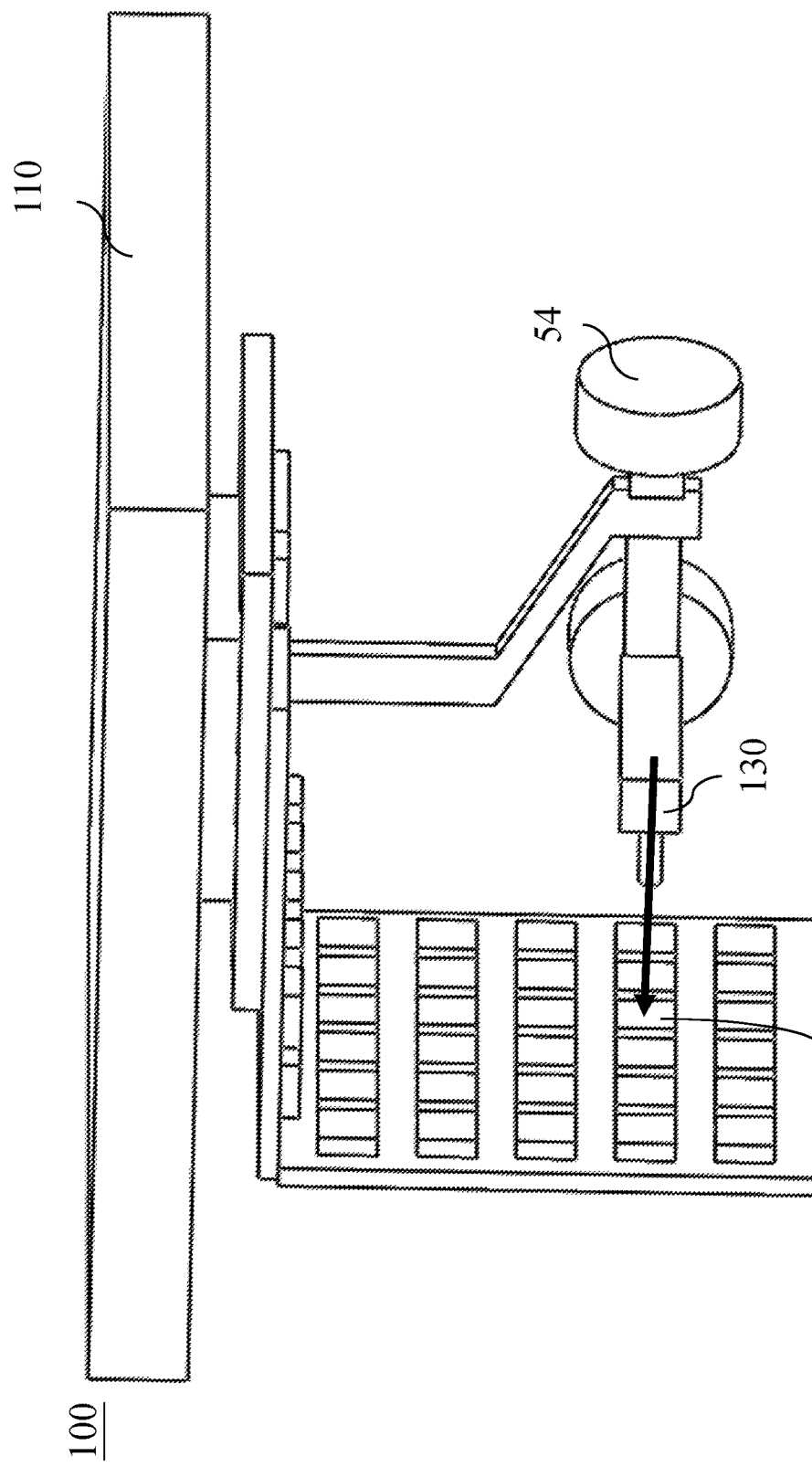
[FIG. 4A]

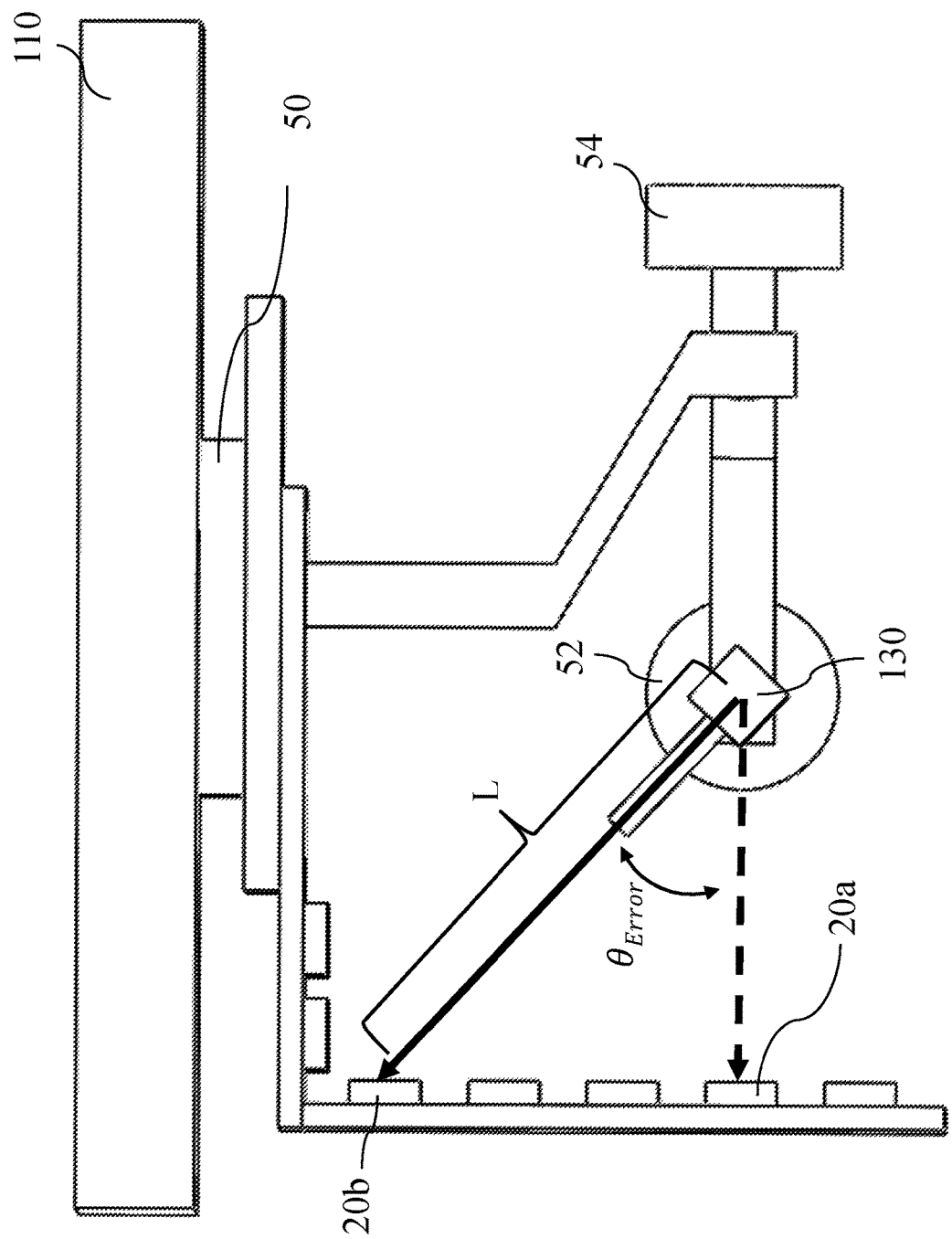
[FIG. 4B]

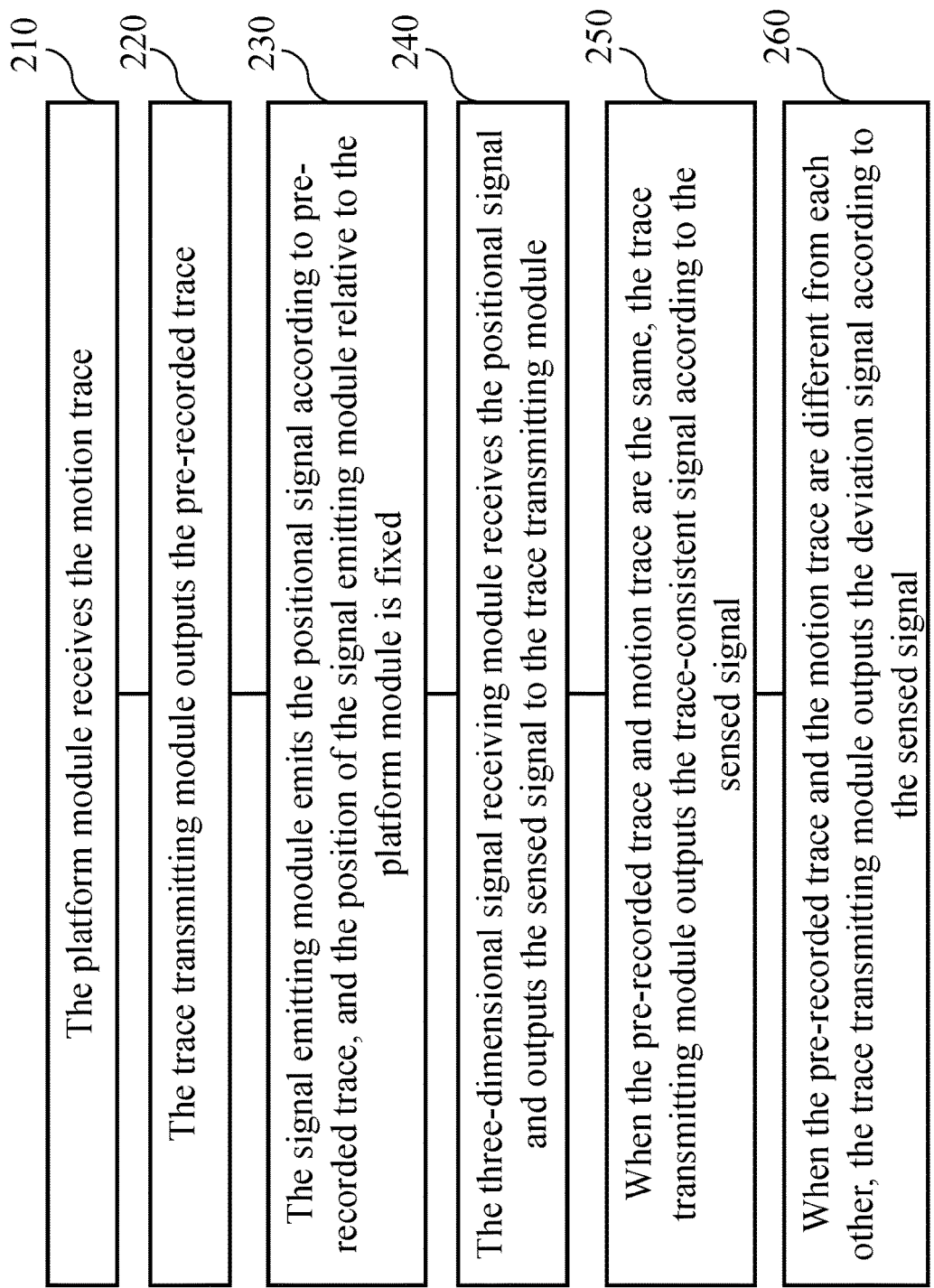
[FIG. 5]

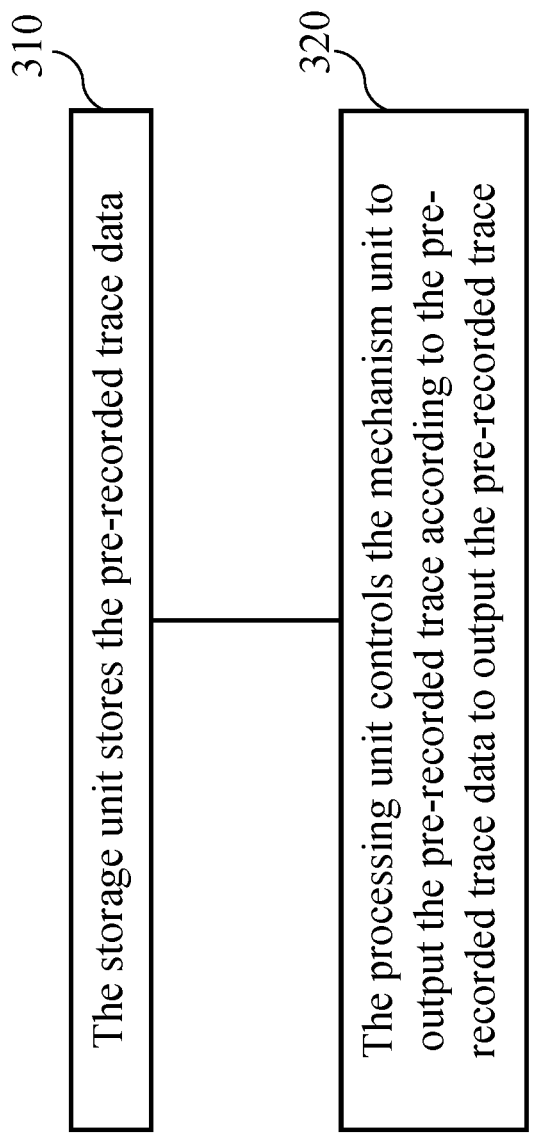
[FIG. 6]

THREE-DIMENSIONAL TRACE VERIFICATION APPARATUS AND METHOD THEREOF

BACKGROUND

1. Technical Field

The present disclosure relates to a trace verification apparatus and method thereof, and more particularly to a three-dimensional trace verification apparatus and method thereof.

2. Description of Related Arts

With the rapid advance of technology, people require higher life quality, so that electronic devices with various functions are available in commercial market in recent years. For example, people start to pay attention on electronic devices having posture balance control function, such as unmanned aircrafts, self-balancing robots, sweeper robots and cradle heads for cameras.

Aforementioned electronic device, which frequently performs posture balance control, usually includes a sensing module and a platform module, and the sensing module is configured to detect and define a position of the platform module in a three-dimensional space. However, it is very difficult to define and track the position of the platform module in the three-dimensional space, and the motion trace of the platform module of the electronic device often mismatches with an anticipated trace subject to external interfere. Furthermore, it is not easy to quantify and record a difference between the motion trace of the platform module and the anticipated trace.

In conclusion, as can be known, the prior art has the problem that the position of conventional platform module in the three-dimensional space is hard to be defined and tracked, and the difference between the motion trace of the platform module and the anticipated trace is also hard to be quantified and recorded. Therefore, what is need is to develop an improved technology to solve the problems.

SUMMARY

An objective of the present disclosure is to provide a three-dimensional trace verification apparatus and a method thereof to solve conventional technical problems.

According to embodiments of the present disclosure, the three-dimensional trace verification apparatus includes a platform module, a trace transmitting module, a signal emitting module and a three-dimensional signal receiving module. The platform module is configured to receive a motion trace. The trace transmitting module is configured to output a pre-recorded trace. The signal emitting module is interlinked with the trace transmitting module and configured to emit a positional signal according to the pre-recorded trace, and a position of the signal emitting module relative to the platform module is fixed. The three-dimensional signal receiving module is fastened with the platform module and configured to receive the positional signal emitted from the signal emitting module, and output a sensed signal to the trace transmitting module. The trace transmitting module outputs a trace-consistent signal according to the sensed signal when the pre-recorded trace is the same as the motion trace, and the trace transmitting module outputs a deviation signal according to the sensed signal when the pre-recorded trace is different from the motion trace.

Furthermore, the present disclosure further provides a three-dimensional trace verification method including following steps: receiving a motion trace by a platform module; outputting a pre-recorded trace by a trace transmitting module; emitting a positional signal by a signal emitting module according to the pre-recorded trace, wherein a position of the signal emitting module relative to the platform module is fixed; receiving the positional signal by a three-dimensional signal receiving module, and outputting a sensed signal to the trace transmitting module; outputting a trace-consistent signal by the trace transmitting module according to the sensed signal when the motion trace is the same as the pre-recorded trace; and outputting a deviation signal by the trace transmitting module according to the sensed signal when the motion trace is different from the pre-recorded trace.

Compared with the conventional technology, the three-dimensional trace verification apparatus and method of the present disclosure can fix the position of the signal emitting module relative to the platform module, and use the trace transmitting module to output the deviation signal according to the sensed signal when the motion trace of the platform module is different from the pre-recorded trace of the trace transmitting module.

By means of aforementioned technology, the apparatus and method of the present disclosure can achieve technical effects of automatically verifying whether the actual motion trace of the platform module is the same as the trace pre-recorded by the user, and recording the trace deviation.

BRIEF DESCRIPTION OF THE DRAWINGS

The structure, operating principle and effects of the present disclosure will be described in detail by way of various embodiments which are illustrated in the accompanying drawings.

FIG. 1 is a structural view of an embodiment of a three-dimensional trace verification apparatus of the present disclosure.

FIG. 2 is a structural view of a platform module, a trace transmitting module and a signal emitting module of the three-dimensional trace verification apparatus of FIG. 1.

FIG. 3A is a schematic structural view of the three-dimensional signal receiving module of FIG. 1, when viewed from an angle.

FIG. 3B is a schematic structural view of the three-dimensional signal receiving module of FIG. 1, when viewed from another angle.

FIG. 4A is a schematic structural view of an embodiment of the three-dimensional trace verification apparatus of the present disclosure, illustrating that the motion trace is the same as a pre-recorded trace.

FIG. 4B is a schematic structural view of an embodiment of the three-dimensional trace verification apparatus of the present disclosure, illustrating that the motion trace is different from the pre-recorded trace.

FIG. 5 is a flowchart of a three-dimensional trace verification method for the three-dimensional trace verification apparatus of the present disclosure.

FIG. 6 is a flowchart of detailed steps of the step 220 of FIG. 5.

DETAILED DESCRIPTION

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present invention. As used herein, the term "or" includes any and all combinations of one or more of the associated listed items.

The structure, operating principle and effects of the present disclosure will be described in detail by way of various embodiments which are illustrated in the accompanying drawings.

Before illustration of the three-dimensional trace verification apparatus and method of the present disclosure, the determination whether traces of two objects are different from each other is illustrated first. A trace is a movement path of an object and is also a set of positional points. In the present disclosure, the determination whether the traces of two objects are different from each other is based on a change of a relative position between the two objects at the same time point, that is, if the relative position between the two objects at the same time point is changed, it is determined that the traces of two objects are different from each other; otherwise, it is determined that the traces of the two objects are the same with each other. Furthermore, a deviation signal described in the present disclosure includes a change value of the relative position between the two objects at the same time point, and the change value may be an angle value or a movement value.

Please refer to FIGS. 1, 2, 3A and 3B, which respectively show a schematic structural view of an embodiment of three-dimensional trace verification apparatus of the present disclosure, a schematic structural view of a platform module, a trace transmitting module and a signal emitting module of the embodiment, and schematic structural views of the three-dimensional signal receiving module of the embodiment when viewed from different angles. The three-dimensional trace verification apparatus 100 includes a platform module 110, a trace transmitting module 120, a signal emitting module 130 and a three-dimensional signal receiving module 140.

The platform module 110 is configured to receive a motion trace. In greater detail, the platform module 110 may be combined with a motion platform of which the motion trace is to be verified whether matching with a user's anticipation, so that the platform module 110 and the motion platform depend on each other, and the motion traces of the motion platform and the platform module 110 are the same. The motion platform is able to move three-dimensionally in the three-dimensional space, for example, the motion platform may roll, pitch or yaw, and the platform module 110 receives the motion trace generated by the motion platform, and the three-dimensional trace verification apparatus 100 is able to track and verify the motion trace of the motion platform.

The trace transmitting module 120 is configured to output a pre-recorded trace which is pre-recorded trace data recorded by the user in advance. The pre-recorded trace data may include rolling motion data (hereinafter referred to as Roll data), pitching motion data (hereinafter referred to as Pitch data), yawing motion data (hereinafter referred to as Yaw data) and time data including multiple time points. According to Roll data, Pitch data, Yaw data at each time point, the trace transmitting module 120 may reproduce a trace which matches with the user's anticipation.

In this embodiment, the trace transmitting module 120 may include a processing unit (not shown in figures), a storage unit (not shown in figures), and a mechanism unit. The processing unit is configured to control the mechanism unit to output the pre-recorded trace according to the pre-recorded trace data stored in the storage unit. The processing unit and the storage unit may be configured in an accommodating space inside the platform module 110; however, the present disclosure is not limited to this embodiment, and the disposal of the processing unit and the storage unit can be adjusted upon demand. It is appreciated that the processing unit and storage unit are not drawn in figures for the sake of simplicity.

In greater detail, the mechanism unit includes a first motor 50, a second motor 52, a third motor 54, a first rod 40 and a second rod 42. The processing unit is electrically coupled with the storage unit, the first motor 50, the second motor 52 and the third motor 54. The storage unit is configured to store the pre-recorded trace data. The first rod 40 includes an end interlinked with the platform module 110 and the other end interlinked with an end of the second rod 42, and the other end of the second rod 42 is interlinked with the signal emitting module 130. The first motor 50 is disposed at a position where the first rod 40 and the platform module 110 are interlinked with each other, and the first motor 50 is disposed between the first rod 40 and the platform module 110. The first motor 50 is configured to control motion corresponding to the Yaw data. The second motor 52 is disposed at a position where the second rod 42 and the signal emitting module 130 are interlinked with each other. The second motor 52 and the signal emitting module 130 are disposed at two opposite sides of the second rod 42, and the second motor 52 is configured to control motion corresponding to the Pitch data. The third motor 54 is disposed at a position where the second rod 42 and the first rod 40 are interlinked with each other. The third motor 54 and the second rod 42 are disposed at two opposite sides of the first rod 40, and the third motor 54 is configured to control motion corresponding to the Roll data. The processing unit may drive the first motor 50, the second motor 52 and the third motor 54 to control the first rod 40 and the second rod 42 according to the pre-recorded trace data stored in the storage unit, so that the trace transmitting module 120 is able to output the pre-recorded trace. Furthermore, by aforementioned interlinking relationship, the motion of the trace transmitting module 120 is independent from the motion platform, that is, the trace transmitting module 120 and the motion platform are operated independently from each other.

The signal emitting module 130 is electrically coupled with the trace transmitting module 120 and has a fixed position relative to the platform module 110, and is configured to emit a positional signal according to the pre-recorded trace. In greater detail, the signal emitting module 130 is interlinked with the trace transmitting module 120 and configured to continuously emit the positional signal in a fixed direction. While the trace transmitting module 120 outputs the pre-recorded trace, the signal emitting module 130 is rotated along the pre-recorded trace in the three-dimensional space, so that the three-dimensional signal receiving module 140 is able to determine a positional change of the signal emitting module 130 in the three-dimensional space by sensing a directional change of the positional signal. For example, the positional signal emitted from the signal emitting module 130 may be, but not limited to, a laser beam. In other embodiment, the positional signal emitted from the signal emitting module 130 may be infra-red light or ultrasound.

The three-dimensional signal receiving module 140 is fastened with the platform module 110 and configured to receive the positional signal emitted from the signal emitting module 130 and then output a sensed signal to the trace transmitting module 120. The three-dimensional signal receiving module 140 is fastened with the platform module 110, so the platform module 110 and the three-dimensional signal receiving module 140 have the same motion trace. In this embodiment, the three-dimensional signal receiving module 140 may include multiple two-dimensional sensing units 20 and a shell member 22 having five planes, and the two-dimensional sensing units 20 are separately arranged on inner peripheral sidewalls 221 of the five planes of the shell member 22 in arrays. The inner peripheral sidewalls 221 are configured to shade the signal emitting module 130, so that the two-dimensional sensing units 20 is able to receive the positional signal emitted from the signal emitting module 130 while the signal emitting module 130 is rotated according to the pre-recorded trace, in order to facilitate determination of a positional change of the signal emitting module 130 in the three-dimensional space. Each of the two-dimensional sensing units 20 may be, not limited to, a laser sensor. Preferably, the two-dimensional sensing unit 20 may be changed according to the positional signal emitted from the signal emitting module 130 actually. For example, when the positional signal emitted from the signal emitting module 130 is infra-red light, each two-dimensional sensing unit 20 may be an infra-red sensor. When the positional signal emitted from the signal emitting module 130 is ultrasound, each two-dimensional sensing unit 20 may be an ultrasonic sensor. Preferably, the three-dimensional signal receiving module 140 may output the sensed signal to a processing unit of the trace transmitting module 120 by a wireless or wired manner.

When the pre-recorded trace and the motion trace are the same, the trace transmitting module 120 outputs a trace-consistent signal according to the sensed signal; when the pre-recorded trace and the motion trace are different from each other, the trace transmitting module 120 outputs a deviation signal according to the sensed signal. The deviation signal may include a change value of the relative positions between the positional points of the pre-recorded trace and the motion trace at the same time, and the change value may be an angle value or a movement value.

Please refer to FIGS. 4A and 4B, which show a structural view of the embodiment of the three-dimensional trace verification apparatus when the pre-recorded trace and motion trace are the same with each other, and a structural view of the embodiment of the three-dimensional trace verification apparatus when the pre-recorded trace and the motion trace are different from each other. It is appreciated that three of the five planes of the shell member of the three-dimensional signal receiving module 140 shown in FIGS. 4A and 4B are not drawn for the sake of simplicity.

According to aforementioned paragraphs, the trace transmitting module 120 and the motion platform are operated independently, that is, the trace transmitting module 120 and the platform module 110 are also operated independently because of the dependent relationship between the platform module 110 and the motion platform.

Furthermore, the position of the signal emitting module 130 relative to the platform module 110 is fixed, it indicates that a fixed offset exists between motion coordinates of the platform module 110 and the three-dimensional signal receiving module 140, so that the two-dimensional sensing units 20a of the three-dimensional signal receiving module 140 may continuously receive the positional signal emitted from the signal emitting module 130, as shown in FIG. 4A.

While the platform module 110 receives the motion trace of the motion platform, the trace transmitting module 120 also outputs the pre-recorded trace, and if the motion trace received by the platform module 110 is the same as the pre-recorded trace outputted from the trace transmitting module 120, the two-dimensional sensing unit 20a continuously receives the positional signal because of the fixed relative location between the signal emitting module 130 and the platform module 110. Please refer to FIG. 4B. When the motion trace received by the platform module 110 is different from the pre-recorded trace, the two-dimensional sensing unit 20b receives the positional signal, that is, there is no fixed relative position relationship between the signal emitting module 130 and the platform module 110, so that the two-dimensional sensing unit other than the two-dimensional sensing unit 20a receives the positional signal. As a result, the processing unit of the trace transmitting module 120 can calculates the error between the pre-recorded trace and the motion trace according to a distance between the two-dimensional sensing unit 20a and the two-dimensional sensing unit 20b, and a time difference between time points when the two-dimensional sensing unit 20a and the two-dimensional sensing unit 20b receives the positional signal, and then outputs the deviation signal. Please refer to FIG. 4B. Assuming that the pre-recorded trace records an upper elevation angle $\theta_{Error}$ at a time point t, but the platform module 110 does not upwardly pitch at the same time point, it means the motion trace received by the platform module 110 is different from the pre-recorded trace, so that the two-dimensional sensing unit 20b receives the positional signal. Absolute positions of the two-dimensional sensing units in the array of the three-dimensional signal receiving module 140 are known, so the deviation error can be calculated based on the distance between the two-dimensional sensing unit 20a and the two-dimensional sensing unit 20b and the time difference T between the time points when the two-dimensional sensing unit 20a and the two-dimensional sensing unit 20b receive the positional signal. In this embodiment, the deviation error of the platform module 110 is $Z_{Error}$, $Z_{Error} = L \times \mathrm{Sin}(\theta_{Error}) \times T$, where L is a distance between the two-dimensional sensing unit 20b and an origin of coordinate of the trace transmitting module 120. However, aforementioned embodiment is for exemplary illustration, and the present disclosure is not limited thereto.

When the motion trace received by the platform module 110 is different from the pre-recorded trace, the processing unit calculates the deviation error based on a deviation angle between the two-dimensional sensing unit which receives the positional signal at current time point and the two-dimensional sensing unit which continuously received the positional signals prior to current time point, and a distance between the two-dimensional sensing unit which receives the positional signal at the current time point and the origin of coordinate of the trace transmitting module 120.

By the aforementioned scheme, the processing unit calculates the three-dimensional deviation movement error and angle error between the motion trace of the platform module 110 and the predetermined trace at each time points. Furthermore, by this scheme, it deduces positive correlation between verification precision of the three-dimensional trace verification apparatus 100 and the array density of the two-dimensional sensing units of the three-dimensional signal receiving module 140. When the array of the two-dimensional sensing units is arranged more densely, the verification precision of the three-dimensional trace verification apparatus 100 is higher.

Please refer to FIG. 5, which shows a flowchart showing the steps in an operation of the three-dimensional trace verification method for the three-dimensional trace verification apparatus of FIG. 1. In a step 210, the platform module receives the motion trace. In a step 220, the trace transmitting module outputs the pre-recorded trace. In a step 230, the signal emitting module emits the positional signal according to pre-recorded trace, and the position of the signal emitting module relative to the platform module is fixed. In a step 240, the three-dimensional signal receiving module receives the positional signal and outputs the sensed signal to the trace transmitting module. In a step 250, when the pre-recorded trace and motion trace are the same, the trace transmitting module outputs the trace-consistent signal according to the sensed signal. In a step 260, when the pre-recorded trace and the motion trace are different from each other, the trace transmitting module outputs the deviation signal according to the sensed signal. The step 210 and step 220 are performed at the same time, and the other steps are performed in a sequential order according to a cause-effect relation.

Please refer to FIG. 6, which is a flowchart showing the detail steps in an operation of the step 220 of FIG. 5. The step 220, in which the trace transmitting module outputs the pre-recorded trace, further includes following steps. In a step 310, the storage unit stores the pre-recorded trace data. In a step 320, the processing unit controls the mechanism unit according to the pre-recorded trace data, to output the pre-recorded trace. The pre-recorded trace data may include Roll data, Pitch data, Yaw data and time data, so that, according to the Roll data, the Pitch data, the Yaw data at each time point, the trace transmitting module 120 may control the mechanism unit to reproduce the pre-recorded trace.

To summarize, the three-dimensional trace verification apparatus and method of the present disclosure fix the position of the signal emitting module relative to the platform module, and use the trace transmitting module to output the deviation signal according to the sensed signal when the motion trace of the platform module is different from the pre-recorded trace of the trace transmitting module, thereby solving the problems existed in the conventional technology.

The present disclosure disclosed herein has been described by means of specific embodiments. However, numerous modifications, variations and enhancements can be made thereto by those skilled in the art without departing from the spirit and scope of the invention set forth in the claims.

What is claimed is:

1. A three-dimensional trace verification apparatus, comprising:
   a platform module configured to receive a motion trace;
   a trace transmitting module configured to output a pre-recorded trace;
   a signal emitting module interlinked with the trace transmitting module, and configured to emit a positional signal according to the pre-recorded trace, wherein a position of the signal emitting module relative to the platform module is fixed; and
   a three-dimensional signal receiving module fastened with the platform module, and configured to receive the positional signal emitted from the signal emitting module, and output a sensed signal to the trace transmitting module;
   wherein the trace transmitting module outputs a trace-consistent signal according to the sensed signal when the pre-recorded trace is the same as the motion trace, and the trace transmitting module outputs a deviation signal according to the sensed signal when the pre-recorded trace is different from the motion trace.

2. The three-dimensional trace verification apparatus according to claim 1, wherein the trace transmitting module comprises a processing unit, a storage unit and a mechanism unit, and the processing unit controls the mechanism unit to output the pre-recorded trace, according to pre-recorded trace data stored in the storage unit.

3. The three-dimensional trace verification apparatus according to claim 2, wherein the mechanism unit comprises a first motor, a second motor, a third motor, a first rod and a second rod, the first rod comprises an end interlinked with the platform module and the other end interlinked with an end of the second rod, and the other end of the second rod is interlinked with the signal emitting module, the first motor is disposed at a position where the first rod and the platform module are interlinked with each other, and the first motor is disposed between the first rod and the platform module, second motor is disposed at a position where the second rod and the signal emitting module are interlinked with each other, the second motor and the signal emitting module are disposed at two opposite sides of the second rod separately, and the third motor is disposed at a position where the second rod and the first rod are interlinked with each other, the third motor and the second rod are disposed at two opposite sides of the first rod separately, and the processing unit controls the first motor, the second motor and the third motor to drive the first rod and the second rod according to the pre-recorded trace data, so that the trace transmitting module outputs the pre-recorded trace.

4. The three-dimensional trace verification apparatus according to claim 2, wherein the pre-recorded trace data includes rolling motion data, pitching motion data, yawing motion data and time data, so that the trace transmitting module reproduces the pre-recorded trace according to the rolling motion data, the pitching motion data, and the yawing motion data at each time point of the time data.

5. The three-dimensional trace verification apparatus according to claim 1, wherein the three-dimensional signal receiving module comprises multiple two-dimensional sensing units and a shell member having five planes, the multiple two-dimensional sensing units are separately arranged on inner peripheral sidewalls of the five planes of the shell member in arrays.

6. The three-dimensional trace verification apparatus according to claim 1, wherein the platform module and the three-dimensional signal receiving module depend on each other.

7. The three-dimensional trace verification apparatus according to claim 1, wherein the positional signal emitted by the signal emitting module is laser beam, infra-red light or ultrasound.

8. A three-dimensional trace verification method, comprising:
receiving a motion trace by a platform module;
outputting a pre-recorded trace by a trace transmitting module;
emitting a positional signal by a signal emitting module according to the pre-recorded trace, wherein a position of the signal emitting module relative to the platform module is fixed;
receiving the positional signal by a three-dimensional signal receiving module, and outputting a sensed signal to the trace transmitting module;
outputting a trace-consistent signal by the trace transmitting module according to the sensed signal when the motion trace is the same as the pre-recorded trace; and
outputting a deviation signal by the trace transmitting module according to the sensed signal when the motion trace is different from the pre-recorded trace.

9. The three-dimensional trace verification method according to claim 8, wherein the trace transmitting module comprises a processing unit, a storage unit and a mechanism unit, and the step of outputting the pre-recorded trace by the trace transmitting module further comprises:
storing pre-recorded trace data in the storage unit; and
controlling the mechanism unit by the processing unit according to the pre-recorded trace data to output the pre-recorded trace.

10. The three-dimensional trace verification method according to claim 9, wherein the mechanism unit comprises a first motor, a second motor, a third motor, a first rod and a second rod, the first rod comprises an end interlinked with the platform module and the other end interlinked with an end of the second rod, and the other end of the second rod is interlinked with the signal emitting module, the first motor is disposed at a position where the first rod and the platform module are interlinked with each other, and the first motor is disposed between the first rod and the platform module, the second motor is disposed at a position where the second rod and the signal emitting module are interlinked with each other, the second motor and the signal emitting module are disposed at two opposite sides of the second rod separately, and the third motor is disposed at a position where the second rod and the first rod are interlinked with each other, the third motor and the second rod are disposed at two opposite sides of the first rod separately, and the processing unit controls the first motor, the second motor and the third motor to drive the first rod and the second rod according to the pre-recorded trace data, so that the trace transmitting module outputs the pre-recorded trace.

11. The three-dimensional trace verification method according to claim 9, wherein the pre-recorded trace data include rolling motion data, pitching motion data, yawing motion data and time data, so that the trace transmitting module reproduces the pre-recorded trace according to rolling motion data, pitching motion data, and yawing motion data at each time point of the time data.

12. The three-dimensional trace verification method according to claim 8, wherein the three-dimensional signal receiving module comprises multiple two-dimensional sensing units and a shell member having five planes, the multiple two-dimensional sensing units are separately arranged on inner peripheral sidewalls of the five planes of the shell member in arrays.

13. The three-dimensional trace verification method according to claim 8, wherein the platform module and the three-dimensional signal receiving module depend on each other.

14. The three-dimensional trace verification method according to claim 8, wherein the positional signal emitted by the signal emitting module is laser beam, infra-red light or ultrasound.

* * * * *